Aug. 19, 1952   T. Q. ELIOT ET AL   2,607,719
EXTRACTIVE DISTILLATION OF OXYGENATED ORGANIC COMPOUNDS
Filed April 15, 1949
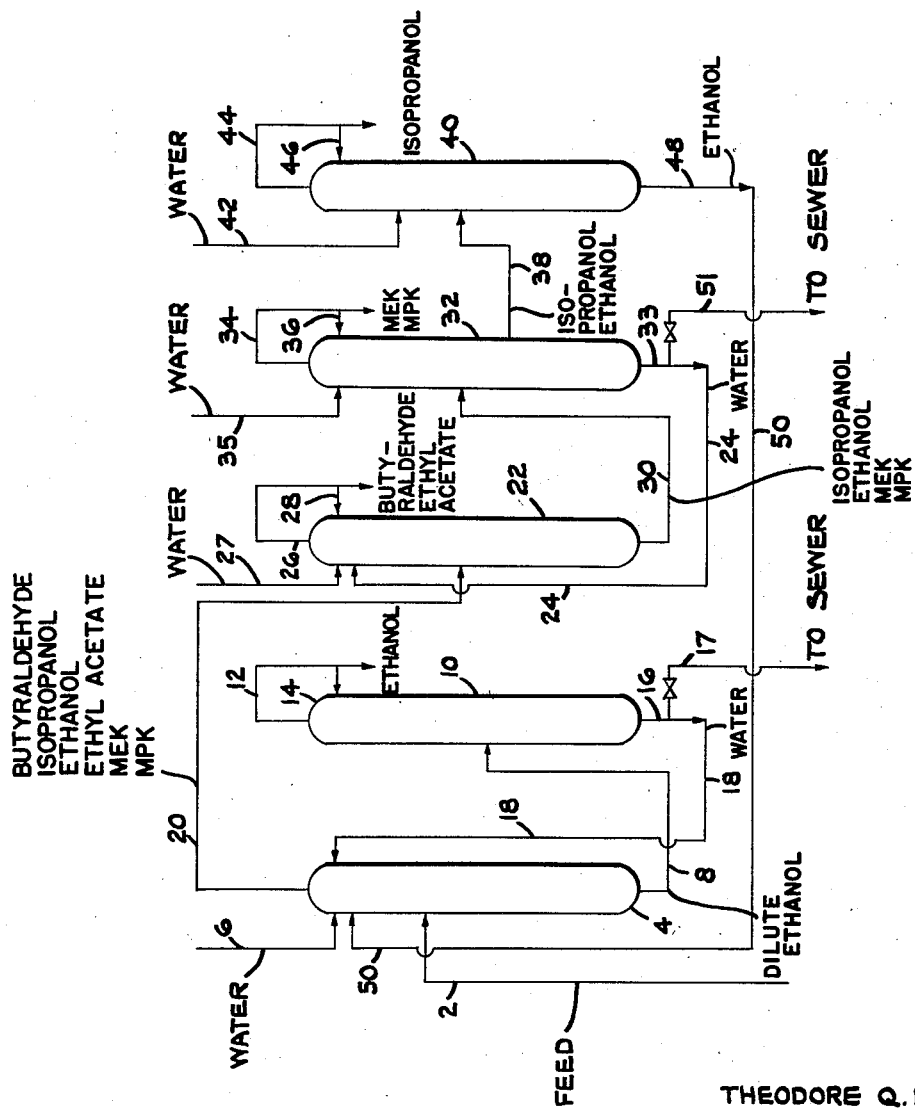
THEODORE Q. ELIOT
CLIFTON S. GODDIN, JR.
JOSEPH C. WEAVER, JR.
    INVENTORS.
BY Arthur McIlroy
ATTORNEY Patented Aug. 19, 1952

2,607,719

UNITED STATES PATENT OFFICE 2,607,719

EXTRACTIVE DISTILLATION OF OXYGENATED ORGANIC COMPOUNDS

Theodore Q. Eliot, Clifton S. Goddin, Jr., and Joseph C. Weaver, Jr., Tulsa, Okla., assignors to Stanolind Oil and Gas Company, Tulsa, Okla., a corporation of Delaware Application April 15, 1949, Serial No. 87,698

7 Claims. (Cl. 202—39.5)

Our invention relates to a method for separating certain organic compounds from one another and from complex organic mixtures in which at least some of the components thereof form azeotropes with one or more of the constituents present therein. More particularly, it relates to the separation of ethanol, isopropanol, and methyl ethyl ketone from one another and from complex aqueous mixtures containing these and other organic compounds.

Mixtures of the type contemplated by our invention are encountered in the water soluble chemicals fraction obtained in the now generally known hydrocarbon synthesis process involving the reduction of carbon monoxide with hydrogen in the presence of a fluidized iron catalyst. In the hydrocarbon synthesis plants now designed for commercial purposes, having capacities of the order of 6000 barrels of liquid hydrocarbons per day, the chemicals present in mixtures of the type contemplated by the process of our invention constitute approximately 30 per cent of the total water soluble chemicals produced or about 140,000 lbs. per day. Accordingly, for economic and other reasons, it is essential that these chemicals be recovered, each in as highly purified form as possible.

Mixtures typical of those with which we are concerned and the relative concentrations in which each component thereof is present are indicated below:

| Component | Weight per cent |
|---|---|
| Butyraldehyde | 4.0 |
| Ethyl acetate | 1.4 |
| Methyl ethyl ketone | 11.1 |
| Methyl propyl ketone | 1.7 |
| Ethanol | 74.0 |
| Isopropanol | 1.4 |
| Water | 6.3 |
| Other impurities | 0.1 |

Some appreciation of the difficulties encountered in attempting to obtain any or all of the above-mentioned oxygenated organic compounds in a substantially pure form when present in such mixtures may be realized by reference to the boiling points of the pure compounds, as well as to their azeotropes either in the aqueous or anhydrous state.

Boiling points of pure chemicals

| | B. P. °C. |
|---|---|
| Butyraldehyde | 75.7 |
| Ethyl acetate | 77.1 |
| Ethanol | 78.4 |
| Methyl ethyl ketone | 79.6 |
| Isopropanol | 82.4 |
| Methyl propyl ketone | 102.0 |

Boiling points of azeotropes

| | B. P. °C. |
|---|---|
| Butyraldehyde-ethanol-water | 67.2 |
| Butyraldehyde-water | 68.0 |
| Ethanol-ethyl acetate-water | 70.3 |
| Ethyl acetate-water | 70.4 |
| Ethyl acetate-ethanol | 71.8 |
| Ethanol-methyl ethyl ketone-water | 73.2 |
| Methyl ethyl ketone-water | 73.5 |
| Ethanol-methyl ethyl ketone | 74.8 |
| Ethyl acetate-methyl ethyl ketone | 76.7 |
| Ethanol-methyl propyl ketone | 77.7 |
| Ethanol-methyl propyl ketone-water | 78.1 |
| Ethanol-water | 78.2 |
| Isopropanol-water | 80.4 |
| Methyl propyl ketone-water | 82.9 |

It will be readily apparent to one skilled in the art to which our invention relates, that the separation in substantially pure form of even a single component from aqueous mixtures of the above type presents a formidable recovery problem. Even if water were removed from this mixture by one of several methods, fractionation of the anhydrous chemicals to yield pure products would not be practicable.

It is an object of our invention to provide an efficient method for the separation of ethanol, isopropanol, methyl ethyl ketone, and methyl propyl ketone from complex mixtures of the type referred to above. It is a further object of our invention to provide a process for obtaining highly purified ethanol from mixtures of the aforesaid type, which meets A. C. S. purity requirements with respect to isopropanol, i. e., not more than 30 parts of isopropanol per million parts of ethanol.

We have now discovered that the foregoing and other objects can be accomplished by subjecting crude mixtures of the type described above to a series of extractive distillations with water. According to the process of our invention, a crude mixture of the aforesaid type is extractively distilled with water, whereby the bulk of the ethanol is washed down the column in the form of a dilute aqueous solution. In this step the fractionating tower is operated under conditions such that an aqueous overhead fraction is secured which contains butyraldehyde, ethyl acetate, methyl ethyl ketone, methyl propyl ketone, isopropanol, and some ethanol. The most difficult component to separate from the ethanol is isopropanol, and we have found that by taking overhead a relatively small percentage of the ethanol at this point in the process the isopropanol in the bottoms ethanol can be reduced to about 30 parts per million or less. In general, we have found that in order to effect a satisfactory separation, dilution water should be added to the column in an amount such that the concentration of water in the liquid within the column is from about 90 to 99 mol per cent, preferably in the range of 95 mol per cent. The amount of net distillate drawoff is carefully controlled so that ethanol of the desired purity is produced. The amount of heat supplied to the column is normally in the range of 100 to 150 B. t. u./lb. of bottoms. A minimum amount of heat is required to secure satisfactory stripping of isopropanol and traces of other impurities. The use of excessive amounts of heat beyond the stripping requirement impairs the efficiency of the column due primarily to decreasing water concentration within the column. The temperatures employed may vary widely, but for the majority of feeds we have found that the tower bottom temperatures range from about 90–98° C., preferably about 96° C., (corrected to atmospheric pressure) and the overhead temperatures range from about 73–88° C., preferably about 76° C.

The quantity of ethanol withdrawn in the overhead stream will vary with the composition of the original feed and the efficiency of the fractionating column employed. Thus, with feeds of the type encountered in the separation of the non-acid water soluble chemicals obtained in the conventional hydrocarbon synthesis process, the ethanol content will generally be found to be in the neighborhood of 60 to 80 per cent of the total chemicals present, while isopropanol is generally present in a concentration of from about 1 to 3 per cent. Accordingly, we have found that with mixtures of the aforesaid type a satisfactory separation of the isopropanol from the bulk of the ethanol may be effected by taking overhead in the initial distillation step a quantity of ethanol corresponding to from about 1 to about 10 weight per cent of that in the original feed mixture. Thus, for example, with a fractionating column having 65 plates and operating at an efficiency of 50 to 60 per cent, we have observed that by taking overhead only about 1.3 weight per cent of the ethanol originally present in the feed, a highly purified form of ethanol (containing about 10 parts per million of isopropanol) can be obtained. With more efficient fractionating columns the amount of ethanol required to be taken overhead becomes less than 1 weight per cent. However, as the concentration of ethanol in the feed decreases or the relative percentage of isopropanol in the feed increases (with a given column and other operating conditions remaining constant), it becomes necessary to withdraw higher percentages of ethanol in the overhead in order to insure a substantially complete separation of the isopropanol from the ethanol in the bottoms. For example, with feeds in which the ratio of ethanol to isopropanol is of the order of 10 to 1 instead of about 30 to 1, as is generally the proportion in the case of hydrocarbon synthesis water-souble-chemicals mixtures, the amount of ethanol withdrawn in the overhead may correspond to as much as about 20 weight per cent of that present in the original feed in order that a satisfactory removal of isopropanol may be achieved.

The dilute aqueous ethanol solution from the base of the column is sent to a conventional fractionating column wherein a constant boiling mixture of ethanol and water of high purity is removed as distillate. The bottoms, which is essentially water, is recycled to provide dilution water for the extractive distillation operation described above. A portion of this water is continuously rejected to the sewer to provide a purge for any heavy impurities in the system.

The crude distillate from the above extractive distillation operation is then subjected to a second extractive distillation with water whereby methyl ethyl ketone, methyl propyl ketone, ethanol, and isopropanol are washed down the column and an aqueous mixture of butyraldehyde and ethyl acetate is taken overhead as distillate.

In general, it may be said that in order to effect a satisfactory separation of butyraldehyde and ethyl acetate from methyl ethyl ketone, methyl propyl ketone, ethanol, and isopropanol at this point, the dilution water should be added to the column in an amount such that the concentration of water in the liquid at any point in the column is from about 90 to 99 mol per cent and preferably about 95 mol per cent. The amount of net overhead withdrawn should be carefully controlled to avoid forcing methyl ethyl ketone, ethanol, or isopropanol overhead or butyraldehyde and ethyl acetate into the bottoms at this stage. Ordinarily the heat input should be in the range of 80–120 B.t.u./lb. of bottoms, preferably about 90 B.t.u./lb. of bottoms. It has been our observation, however, that the use of an excessive amount of heat impairs the efficiency of the column since under such conditions the concentration of water in the column falls below the value we have found suitable for effecting the desired separation. In this connection, the temperatures employed may vary rather widely. For the majority of feeds, however, we have found that bottom tower temperatures of from 82° to about 94° C. (corrected to atmospheric pressure), preferably about 85° C. and top tower temperatures of from about 68° to about 77° C., preferably 71° C., are satisfactory. The overhead stream obtained in this operation is an aqueous mixture of butyraldehyde and ethyl acetate which may, if desired, be further separated into its individual components. The bottoms portion obtained as a result of this distillation step contains ethanol, isopropanol, methyl ethyl ketone, and methyl propyl ketone in a total concentration of the order of 1 mol per cent. The dilute bottoms fraction containing these chemicals is introduced at an intermediate point in another fractionating column where a third extractive distillation operation is effected. In this separation step, however, the water azeotropes of methyl ethyl ketone and methyl propyl ketone free of alcohols are collected as an overhead stream, a dilute (from about 2 to 10 weight per cent) aqueous solution of isopropanol and ethanol is withdrawn from the column as a side stream below the point at which the feed is introduced, while water is withdrawn from the bottom of the column and recycled. In effecting this separation dilution water is introduced at the top of the column in an amount such that the concentration of water in the liquid at any point in the column above the point of side stream withdrawal ranges between about 80 and 99 mol per cent, preferably 85 mol per cent. Heat input to the column will normally be between 125–300 B.t.u./lb. of bottoms. Under these conditions isopropanol and ethanol relatively free from ketones can be withdrawn in the form of an aqueous solution as a side stream below the point at which the feed is introduced. The observations relative to heat input discussed above are equally pertinent to the separation of methyl ethyl ketone, methyl propyl ketone, and water from isopropanol, ethanol, and water. While the actual temperatures employed at this stage of our process may vary widely, we have found that in the majority of instances the bottom temperature will be the boiling point of water, while top temperatures may be in the range of from about 73° to 83° C. and preferably about 74° C. The temperature at which the side stream of aqueous isopropanol and ethanol is withdrawn should generally range between about 92° and about 99° C. (corrected to atmospheric presure) depending on the concentration selected for the drawoff stream.

If desired, the methyl ethyl ketone and methyl propyl ketone contained in the distillate from this operation can be separated by first removing the azeotropic water and then separating the anhydrous ketones by means of conventional fractional distillation.

The dilute aqueous side stream of isopropanol and ethanol is next introduced at an intermediate point of still another extractive distillation column where isopropanol is taken off overhead and ethanol is withdrawn as a bottoms stream. The isopropanol is removed in the form of an azeotrope with water by introducing the dilution water at a point substantially below the takeoff level for the aqueous isopropanol. In this distillation the quantity of water introduced is such that the concentration in the liquid at any point in the column below the point of water introduction is in the range of from about 90 to 99 mol per cent, preferably 95 mol per cent. The aqueous ethanol solution obtained from the base of this column is recycled to supply a portion of the dilution water for the column initially described in the process of our invention. Bottom temperatures may range from 90° to 98° C. (corrected to atmospheric pressure), but are generally preferably held to about 97° C., while the top tower temperature is about 80.6° C. corresponding to the boiling point of the isopropanol-water azeotrope. Heat input is preferably in the range of 100–150 B. t. u./lb. of bottoms.

One embodiment of our invention is shown diagrammatically by the accompanying drawing. Referring to the drawing, a charging stock comprising essentially an aqueous solution of butyraldehyde, ethyl acetate, methyl ethyl ketone, methyl propyl ketone, isopropanol, and ethanol obtained, for example, in the hydrogenation of carbon monoxide in the presence of a fluidized iron catalyst, is introduced through line 2 into an intermediate section of column 4 where it is fractionally distilled. The vapors rising through the column encounter a stream of water introduced at the top thereof through line 6. Under these conditions ethanol is selectively washed down the column and withdrawn therefrom through line 8 after which this solution is introduced into column 10 where a constant boiling mixture of ethanol and water is withdrawn overhead through line 12, part of which is returned to the top of the column through line 14 as reflux. The bottoms, which consists essentially of water, is withdrawn through line 16 and a portion thereof transferred through line 18 to the top of column 4 to be recycled as dilution water. The remaining bottoms water is withdrawn through line 17 and run to the sewer. The overhead fraction from column 4 which contains butyraldehyde, ethyl acetate, methyl ethyl ketone, methyl propyl ketone, isopropanol, water, and a relatively small amount (usually from about 1 to 10 weight per cent, based on the concentration of ethanol in the original feed) of ethanol is withdrawn through line 20 and introduced into column 22 where the feed is extractively distilled. The vapors rising in column 22 encounter a stream of water introduced at the top thereof through line 27. In this column butyraldehyde, ethyl acetate, and water are removed in the form of azeotropes as an overhead fraction through line 26 and partially recycled as reflux through line 28. The bottoms portion, which consists of an aqueous solution of methyl ethyl ketone, methyl propyl ketone, isopropanol, and ethanol, is withdrawn through line 30 and introduced into column 32 where extractive distillation is again effected by introducing water into the column through line 35, resulting in methyl ethyl ketone, methyl propyl ketone, and azeotropic water going overhead through line 34, some of which is returned as reflux through line 36, while a side stream of isopropanol, ethanol, and water is withdrawn through line 38 and introduced into column 40. The bottoms from column 32, consisting essentially of water, is withdrawn through line 33 and in part recycled as dilution water to column 22 through line 24 while the remainder is withdrawn through line 51 and run to the sewer. Isopropanol is separated from ethanol in column 40 by means of still another extractive distillation with water which is introduced through line 42. In this instance an azeotrope of isopropanol and water is withdrawn through line 44, part of which is returned to column 40 through line 46 as reflux, while a dilute solution of ethanol is withdrawn as a bottom stream through line 48 and recycled through line 50 to column 4, where it is employed as a source of dilution water.

In the above-mentioned drawing reference to certain equipment such as pumps, reboilers, gages and the like which obviously would be necessary to operate the process has been intentionally omitted. Only sufficient equipment has been diagrammatically shown to illustrate the process, and it is intended that no undue limitation be read into our invention by reference to the drawing and description thereof.

In every instance where separation is effected by means of extractive distillation, the amount of heat which may be admitted to the column employed is primarily determined by the feed composition, the amount of dilution water added, and the type of separation desired. In contrast to conventional fractionating columns, however, the heat input must be established between definite maximum and minimum limits if, as hereinbefore defined, successful operation is to be obtained. While our process may be carried out at reduced or superatmospheric pressures, we prefer, in general, to employ atmospheric pressure.

Among the outstanding and surprising features of our invention is the fact that by the use of only water as an extractive distillation agent, sharp separations can be made between the several constituents which not only boil very close together but form numerous azeotropes. This fact appears to be all the more surprising when it is realized that the concentration of water employed in such extractive distillation processes is generally within the relatively narrow range of 85-95 mol per cent. For example, in the first extractive distillation operation only ethanol is removed from the base of the column while all other constituents, including those which in the anhydrous state boil as much as 25° C. higher than ethanol, are removed overhead. Even under the conditions specified for this column, the separation of isopropanol from ethanol is very difficult, and we have found it necessary to withdraw some of the ethanol in the distillate in order to effect substantially complete removal of isopropanol.

By changing conditions slightly in the second extractive distillation, the alcohols and ketones are separated from the aldehyde and ester with which they form close boiling azeotropes. In the third extractive distillation, both alcohols are separated from both ketones by taking off the latter as an overhead stream, in spite of the fact that the heavy ketone boils considerably higher than either of the alcohols, and that numerous azeotropes are possible. In the fourth extractive distillation, by employing high dilution and precise temperature control, it is possible to achieve a sharp separation between the two most difficultly separable constituents, namely isopropanol and ethanol. Thus, it is our observation that the components of the mixtures involved show varying degrees of non-ideality in the presence of water and by careful control of such variables as heat input, water concentration, and temperature gradient it is possible to effect the separations herein described.

It will be apparent, in view of the foregoing description, that the process of our invention may be modified in numerous ways without materially departing from the scope thereof. Thus, while the application of our invention has been described principally in connection with the separation of components present in the proportions typical of those found in the water soluble chemicals stream obtained in the hydrocarbon synthesis process, it is to be strictly understood that our invention is equally applicable to the treatment of mixtures in which the common components of the aforesaid water soluble chemicals stream are to be found in proportions substantially different.

We claim:

1. In a process for the separation of butyraldehyde and ethyl acetate from an aqueous mixture containing methyl ethyl ketone, the steps which comprise subjecting said mixture to fractional distillation in a column in which a heat input of from 80 to 120 B. t. u./lb. of bottoms is employed, introducing water into said column countercurrently to the flow of the vaporized mixture in an amount such that the concentration of water in the liquid at any point in the column is from about 95 to about 99 mol per cent, and withdrawing a bottom stream containing methyl ethyl ketone and an overhead fraction comprising butyraldehyde and ethyl acetate.

2. In a process for effecting separation of butyraldehyde and ethyl acetate from aqueous mixtures consisting of methyl ethyl ketone, butyraldehyde and ethyl acetate, the steps which comprise subjecting said mixture to fractional distillation in a column in which a heat input of from about 80 to 120 B. t. u./lb. of bottoms is employed, introducing water into said column countercurently to the flow of the vaporized mixture in an amount such that the concentration of water in the liquid at any point in the column is from about 90 to about 99 mol per cent, and withdrawing an aqueous bottom stream of methyl ethyl ketone and an overhead fraction of butyraldehyde and ethyl acetate.

3. In a process for the separation of butyraldehyde and ethyl acetate from an aqueous mixture consisting of methyl ethyl ketone and said butyraldehyde and ethyl acetate, the steps which comprise subjecting said mixture to fractional distillation in a column in which a heat input of from 80 to 120 B. t. u./lb. of bottoms is employed to give a bottom tower temperature of from 82° to 94° C. and an overhead temperature of from about 68° to about 77° C., introducing water into said column in an amount such that the concentration of water in the column is from about 90 to about 99 mol per cent, and withdrawing an overhead stream of butyraldehyde, water, and ethyl acetate and a bottoms stream of methyl ethyl ketone and water.

4. In a process for separating butyraldehyde and ethyl acetate from aqueous mixtures containing methyl ethyl ketone and methyl propyl ketone, the steps which comprise subjecting said mixture to fractional distillation in a column in which a heat input of from 80 to 120 B. t. u./lb. of bottoms is employed to give a bottom tower temperature of from 82° to 94° C., and an overhead temperature of from about 68° to about 77° C., introducing water into said column in an amount such that the concentration of water in the column is from about 95 to about 99 mol per cent, and withdrawing an overhead stream of butyraldehyde, water, and ethyl acetate and a bottom stream containing methyl ethyl ketone, methyl propyl ketone, and water.

5. The process of claim 1 in which the mixture subjected to fractional distillation contains butyraldehyde, ethyl acetate, methyl ethyl ketone, methyl propyl ketone, isopropanol and ethanol.

6. The process of claim 3 in which the mixture subjected to fractional distillation consists of methyl ethyl ketone, butyraldehyde, ethyl acetate, isopropanol and ethanol.

7. The process of claim 4 in which the aqueous mixture subjected to fractional distillation contains butyraldehyde, ethyl acetate, methyl ethyl ketone, methyl propyl ketone, isopropanol and ethanol.

THEODORE Q. ELIOT.
CLIFTON S. GODDIN, Jr.
JOSEPH C. WEAVER, Jr.

REFERENCES CITED

The following references are of record in the file of this patent:

UNITED STATES PATENTS

| Number | Name | Date |
|---|---|---|
| 887,793 | Guillaume | May 19, 1908 |

(Other references on following page)

UNITED STATES PATENTS

| Number | Name | Date |
|---|---|---|
| 996,328 | Guillaume | June 27, 1911 |
| 1,929,901 | Ricard et al. | Oct. 10, 1931 |
| 2,198,651 | Bludworth | Apr. 30, 1940 |
| 2,290,442 | Metzl | July 21, 1942 |
| 2,321,748 | Hopkins et al. | June 15, 1943 |
| 2,551,584 | Carlson et al. | May 8, 1951 |
| 2,551,593 | Gilliland et al. | May 8, 1951 |
| 2,551,625 | Morrell et al. | May 8, 1951 |
| 2,551,626 | Morrell et al. | May 8, 1951 |
| 2,552,412 | Drout | May 8, 1951 |

FOREIGN PATENTS

| Number | Country | Date |
|---|---|---|
| 598,346 | Great Britain | Feb. 17, 1948 |

OTHER REFERENCES

Young, "Distillation Principles and Processes," published 1922 by Macmillan and Co., Ltd., London, England. (Copy in Division 6, pages 287 (last paragraph) 288 and 289.)

Mariller, "Distillation et Rectification," published 1925, by Donond, 92 Rue Bonaparte (VI), Paris, France. (Copy in Division 25, pages 101 (last paragraph)–107, 412–433.)